(12) United States Patent
Zhang et al.

(10) Patent No.: US 10,565,252 B2
(45) Date of Patent: Feb. 18, 2020

(54) SYSTEMS AND METHODS FOR CONNECTING TO DIGITAL SOCIAL GROUPS USING MACHINE-READABLE CODE

(71) Applicant: Facebook, Inc., Menlo Park, CA (US)

(72) Inventors: Jiaheng Zhang, Seattle, WA (US); Chen Xu, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 216 days.

(21) Appl. No.: 15/697,408

(22) Filed: Sep. 6, 2017

(65) Prior Publication Data
US 2019/0073385 A1   Mar. 7, 2019

(51) Int. Cl.
| | |
|---|---|
| G06F 16/532 | (2019.01) |
| G06T 1/20 | (2006.01) |
| G06T 1/60 | (2006.01) |
| G06F 16/955 | (2019.01) |
| G06Q 50/00 | (2012.01) |
| G06F 16/13 | (2019.01) |

(52) U.S. Cl.
CPC ........ *G06F 16/532* (2019.01); *G06F 16/9554* (2019.01); *G06T 1/20* (2013.01); *G06T 1/60* (2013.01); *G06F 16/137* (2019.01); *G06Q 50/01* (2013.01)

(58) Field of Classification Search
CPC ....... G06F 16/532; G06F 16/137; G06T 1/20; G06T 1/60; G06Q 50/01
See application file for complete search history.

(56) References Cited

U.S. PATENT DOCUMENTS

| | | | | |
|---|---|---|---|---|
| 9,767,645 | B1* | 9/2017 | Cronin | G07F 17/3241 |
| 10,275,643 | B2* | 4/2019 | Nakada | H04N 1/21 |
| 2012/0089449 | A1* | 4/2012 | Yu | G06Q 30/0222 |
| | | | | 705/14.23 |
| 2013/0043302 | A1* | 2/2013 | Powlen | G06F 16/381 |
| | | | | 235/375 |
| 2013/0159233 | A1* | 6/2013 | Mason | G06N 5/00 |
| | | | | 706/45 |

(Continued)

OTHER PUBLICATIONS

How do QR codes work; http://www.createqrcodes.org/how-do-qr-codes-work.html; as accessed Aug. 2, 2017 (dated Jun. 13, 2013).

(Continued)

*Primary Examiner* — Pinalben Patel
(74) *Attorney, Agent, or Firm* — FisherBroyles, LLP

(57) ABSTRACT

A computer-implemented method for connecting to digital groups using machine-readable code may include (1) using an image sensor on a user's mobile device to digitally scan a machine-readable code associated with a digital social group organized via a social-networking platform and (2) using a system processor of the user's mobile device to (i) decode a data item, encoded in the machine-readable code, that includes a hash string to be sent to a server managed by the social-networking platform, (ii) send, to the server, the hash string encoded in the machine-readable code, and (iii) present, via a display element of the user's mobile device, a group page of the digital social group sent by the server in response to the server receiving the hash string. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2013/0318051 A1* | 11/2013 | Kumar | G06F 16/1748 | 707/692 |
| 2014/0180817 A1* | 6/2014 | Zilkha | G06Q 30/02 | 705/14.55 |
| 2015/0324863 A1* | 11/2015 | Pugh | G06Q 30/0226 | 705/14.27 |
| 2016/0134601 A1* | 5/2016 | Finlow-Bates | H04L 63/061 | 713/165 |
| 2018/0063051 A1* | 3/2018 | Chabukashvili | G06Q 50/01 | |

OTHER PUBLICATIONS

How QR codes work and why they suck so hard; http://gizmodo.com/5969312/how-qr-codes-work-and-why-they-suck-so-hard; as accessed Aug. 2, 2017 (dated Dec. 30, 2012).

QR code; https://en.wikipedia.org/wiki/QR_code; as accessed Aug. 2, 2017 (dated Oct. 19, 2004).

QR Code Features; https://web.archive.org/web/20130129064920/http://www.qrcode.com/en/qrfeature.html; as accessed Aug. 4, 2017 (dated Jun. 18, 2012).

About 2D Code; https://web.archive.org/web/20130129065726/http://www.qrcode.com:80/en/aboutqr.html; as accessed Aug. 4, 2017 (dated Jun. 17, 2012).

QR Code Introduction; https://web.archive.org/web/20130202232118/http://www.qrcode.com:80/en/qrgene1.html; as accessed Aug. 4, 2017 (dated Jun. 19, 2012).

Types of Barcodes: Choosing the Right Barcode; https://www.scandit.com/types-barcodes-choosing-right-barcode/; as accessed Aug. 4, 2017 (dated Oct. 21, 2016).

Facebook Tips: What's the Difference between a Facebook Page and Group?; https://www.facebook.com/notes/facebook/facebook-tips-whats-the-difference-between-a-facebook-page-and-group/324706977130/; as accessed Aug. 6, 2017 (dated Feb. 24, 2010).

* cited by examiner

SYSTEMS AND METHODS FOR CONNECTING TO DIGITAL SOCIAL GROUPS USING MACHINE-READABLE CODE

BACKGROUND

Social-networking platforms have dramatically improved users' ability to digitally maintain existing relationships and to digitally find and connect with new relationships. Some social-networking platforms allow users to connect and coordinate as a group by allowing users to create digital groups with digital group pages. Unfortunately, in some instances, a user's ability to join a digital group may be limited by his or her ability to learn of the group or to remember how to connect to the group after having learned of the group. The instant disclosure, therefore, identifies the need for improved systems and methods for connecting users with digital groups.

SUMMARY

As will be described in greater detail below, the instant disclosure describes various systems and methods for connecting to digital groups using machine-readable code. In one example, a method for connecting to digital groups using machine-readable code may include (1) using an image sensor on a user's mobile device to digitally scan a machine-readable code associated with a digital social group organized via a social-networking platform and (2) using a system processor of the user's mobile device to (i) decode at least one data item, encoded in the machine-readable code, that includes a hash string to be sent to a server managed by the social-networking platform, (ii) send, to the server, the hash string encoded in the machine-readable code, and (iii) present, via a display element of the user's mobile device, a group page of the digital social group sent by the server in response to the server receiving the hash string.

In some examples, prior to sending the group page to the user's mobile device, the server may automatically join an online account of the user to the digital social group. In one embodiment, the method may further include, prior to presenting the group page via the display element, presenting, via the display element of the user's mobile device, a prompt from the social-networking platform to create an online account with the social-networking platform.

In one example the steps of the method may be performed by an application installed on the user's mobile device that is managed by the social-networking platform. In some embodiments, the machine-readable code may be located on a physically printed medium, such as a poster.

In one example, an organizer of the digital social group may have created the machine-readable code using a code creation tool provided by the social-networking platform. In this example, the machine-readable code may include a customized image selected by the organizer. In some examples the machine-readable code may represent a two-dimensional matrix code. For example, the machine-readable code may represent a Quick Response (QR) code.

In one embodiment, the hash string may include a request to access the group page of the digital social group. Additionally or alternatively, the hash string may include source information describing a source from which the machine-readable code was scanned. In one example, the server may create a report of sources from which the machine-readable code has been scanned based at least in part on source information received in the hash string from the user's mobile device.

In some embodiments, the hash string may include a restriction to joining the digital social group. For example, the hash string may include a user demographic restriction. In this example, the server may determine that an online account of the user is eligible to join the digital social group based on a determination that a user demographic of the user satisfies the restriction. Examples of user demographics may include, without limitation, an age of the user, a gender of the user, and a geographic location of the user. In another example, the hash string may include a time restriction. In this example, the server may determine that an online account of the user is eligible to join the digital social group based on a determination that a time at which the user's mobile device sent the hash string satisfies the time restriction.

In addition, a corresponding system for connecting to digital groups using machine-readable code may include several modules stored in memory of a user's mobile device, including (1) a scanning module configured to use an image sensor on the user's mobile device to digitally scan a machine-readable code associated with a digital social group organized via a social-networking platform, (2) a decoding module configured to decode a data item, encoded in the machine-readable code, that includes a hash string to be sent to a server managed by the social-networking platform, (3) a sending module configured to send, to the server, the hash string encoded in the machine-readable code, and (4) a presenting module configured to present, via a display element of the user's mobile device, a group page of the digital social group sent by the server in response to the server receiving the hash string. The system may also include at least one physical processor configured to execute the scanning module, the decoding module, the sending module, and the presenting module.

In some examples, the above-described method may be encoded as computer-readable instructions on a computer-readable medium. For example, a computer-readable medium may include one or more computer-executable instructions that, when executed by at least one processor of a user's mobile device, may cause the mobile device to (1) use an image sensor on the user's mobile device to digitally scan a machine-readable code associated with a digital social group organized via a social-networking platform, (2) decode a data item, encoded in the machine-readable code, that includes a hash string to be sent to a server managed by the social-networking platform, (3) send, to the server, the hash string encoded in the machine-readable code, and (4) present, via a display element of the user's mobile device, a group page of the digital social group sent by the server in response to the server receiving the hash string.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
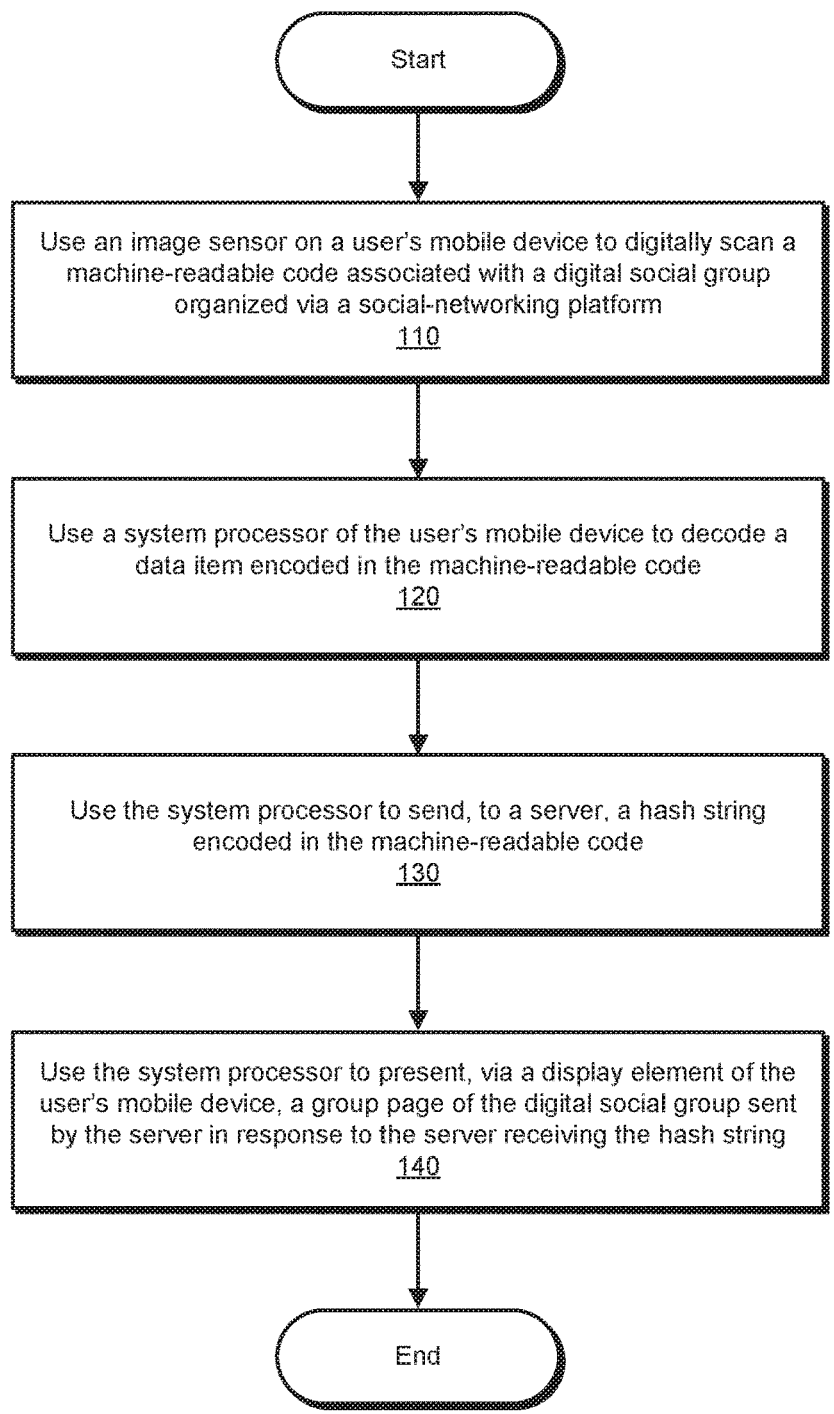
FIG. 1 is a flow diagram of an exemplary method for connecting to digital social groups using machine-readable code.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for connecting to digital social groups using machine-readable code. As will be explained in greater detail below, embodiments of the instant disclosure may connect a user of a mobile device to a digital social group using (1) an image sensor embedded in the mobile device to digitally scan a machine-readable code associated with the digital social group and (2) a system processor to (i) decode content from the machine-readable code, (ii) connect to a server indicated in the content, and (iii) present a group page of the digital social group, received from the server in response to connecting to the server, via a display element of the mobile device.

These embodiments may improve the ease with which a user may connect to the digital world from the physical world by allowing a user to use a mobile device to scan a machine-readable code encountered in the physical world (e.g., on a poster) and, in response, be automatically connected to a digital social group via the mobile device.

For example, the user may use a social-networking application installed on the user's mobile device to scan and decode a machine-readable code and, in response, to be digitally connected with the digital social group. In this example, the social-networking application may be created, managed, and/or sponsored by a social-networking platform hosting the digital social group. Using the social-networking application to scan the machine-readable code may relieve security concerns associated with using traditional code-scanning applications dedicated to scanning and responding to machine-readable code. For example, the social-networking application may be limited to only sending users to content hosted by the social-networking platform, mitigating and/or eliminating the risk that scanning a machine-readable code may lead to malicious content.

Figure 2:
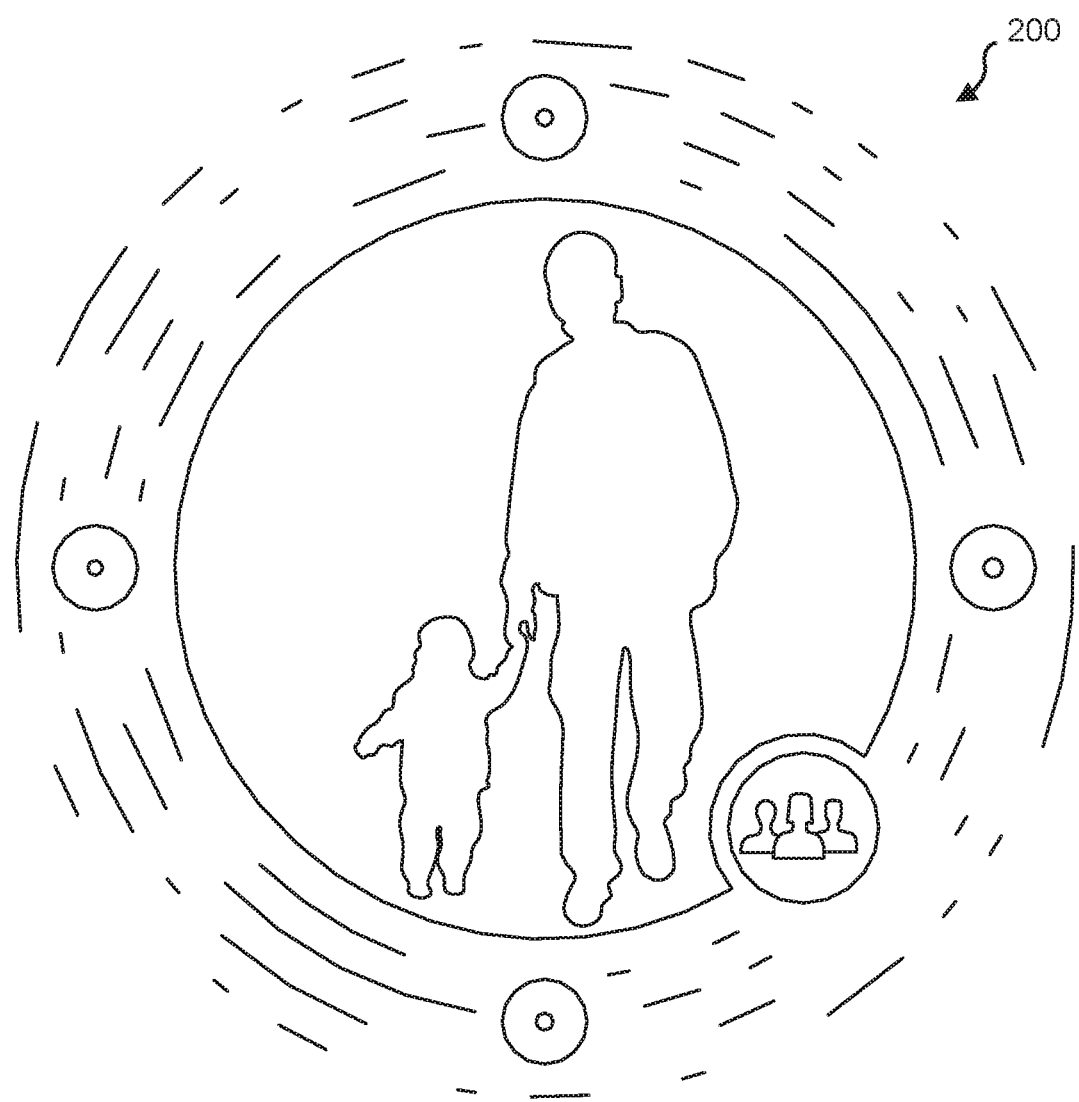
FIG. 2 is an illustration of an exemplary machine-readable code.
Figure 3:
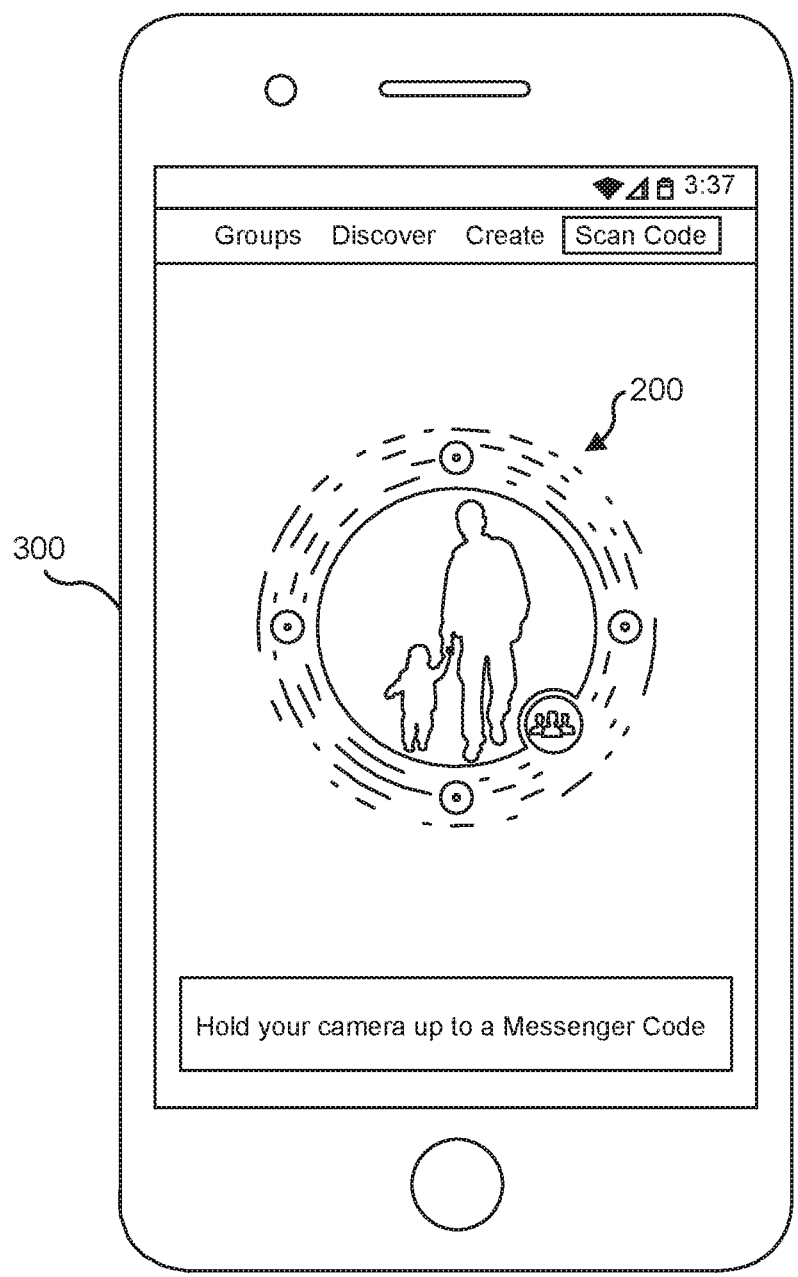
FIG. 3 is an illustration of an exemplary mobile device scanning the machine-readable code from FIG. 2.
Figure 4:
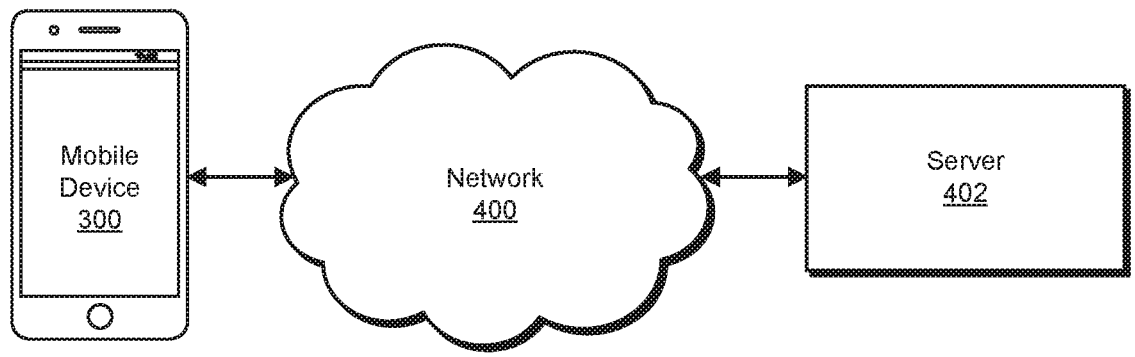
FIG. 4 is a block diagram of the mobile device from FIG. 2 connecting with an exemplary server over a network.
Figure 5:
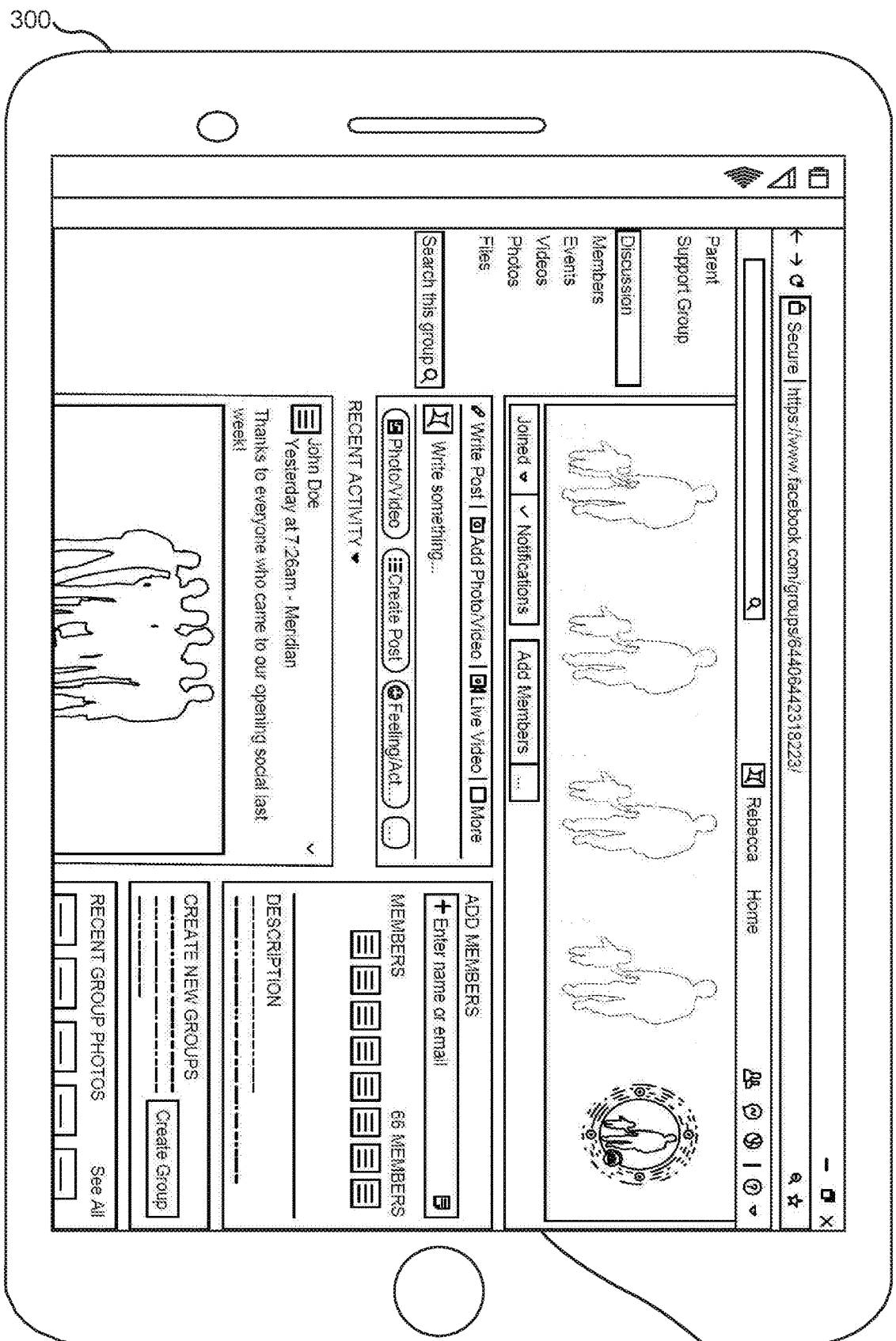
FIG. 5 is an illustration of an exemplary digital group page.

The following will provide, with reference to FIGS. 1 and 3-4, detailed descriptions of systems and methods for digitally connecting a user of a mobile device to an online social group using machine-readable code. Detailed descriptions of an exemplary machine-readable code will also be provided in connection with FIG. 2. Additionally, detailed descriptions of an exemplary group page will be provided in connection with FIG. 5 and detailed descriptions of an exemplary administrator group-information page will be provided in connection with FIG. 6.

As illustrated in FIG. 1, at step 110, one or more of the systems described herein may use an image sensor on a user's mobile device to digitally scan a machine-readable code associated with a digital social group organized via a social-networking platform. Using FIG. 2 as a specific example, the image sensor may digitally scan machine-readable code 200.

As used herein, the term "digital social group" may refer to any type or form of digital group page (such as a webpage), managed and/or accessed via a social-networking platform, that is dedicated to a particular social group. In one embodiment, the digital group page may allow members of the group to share information and/or express ideas by submitting a digital post to the digital group page. In some examples, a user may be required to obtain administrator approval prior to joining the digital social group and/or the digital group page may be joined by invitation only. In other examples, the digital group page may be publicly available such that any user may join the group without first obtaining approval for doing so. In one embodiment, joining the digital social group may add a user's online account to a list of members belonging to the digital social group. Additionally, joining the digital social group may allow the user's online account to (1) access the digital group page, (2) post content and/or interact with content on the digital group page, and/or (3) receive electronic communications relating to the digital social group and/or sent via the digital group page.

As used herein, the term "machine-readable code" may refer to any type or form of optical code that may be scanned and interpreted by a digital device. In one embodiment, the machine-readable code may represent a one-dimensional barcode. In other embodiments, the machine-readable code may represent a two-dimensional matrix code that includes data in patterns that present in both horizontal and vertical components of the code. For example, the machine-readable code may represent a quick response (QR) code. In one embodiment, the machine-readable code may be associated with a particular social-networking platform, such as the social-networking platform used to organize the digital social group.

Figure 6:
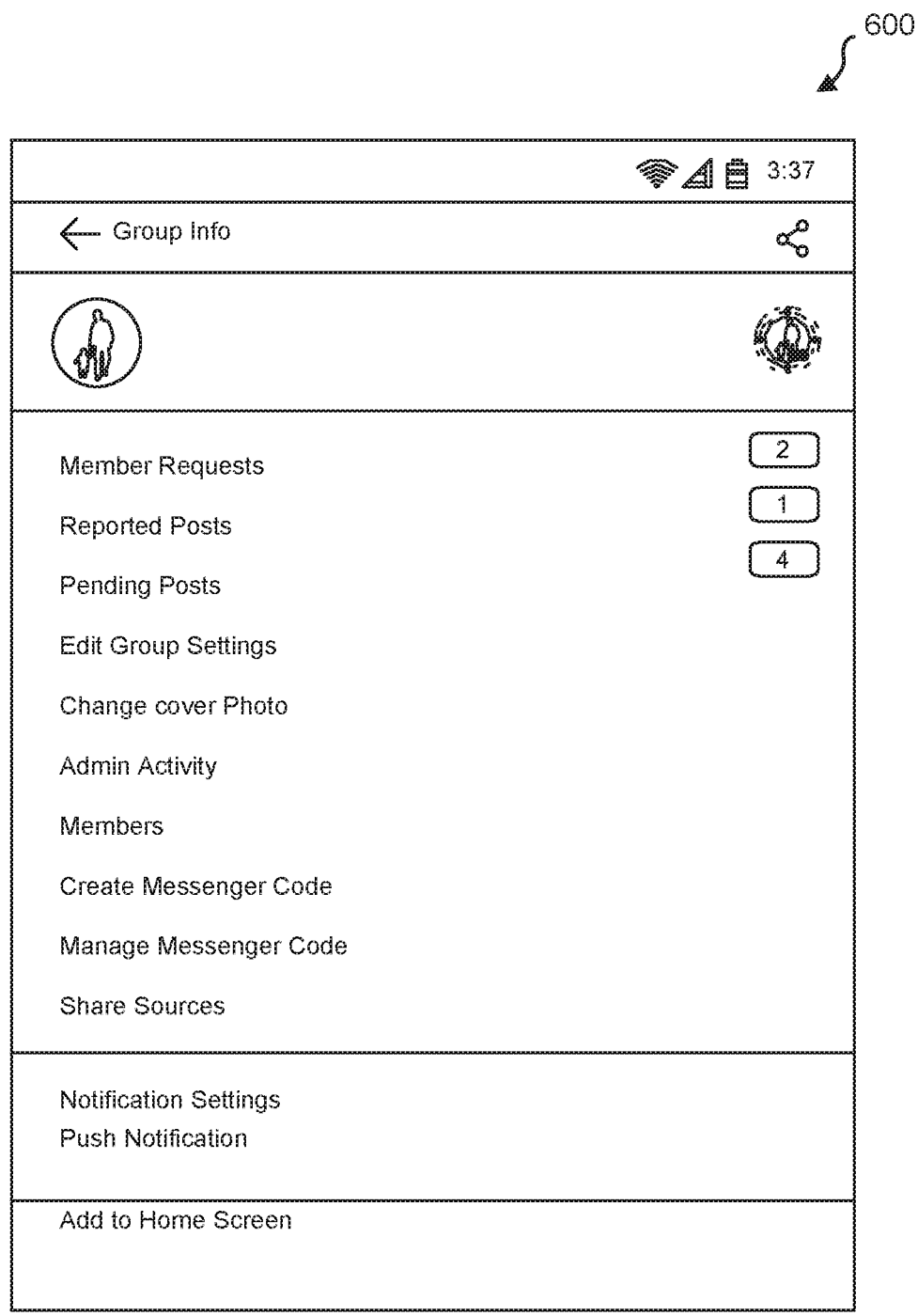
FIG. 6 is an illustration of an exemplary digital group administrator page.

In some examples, the machine-readable code may have been created via the social-networking platform. For example, a member of the digital social group (e.g., an organizer and/or an administrator of the group) may have generated the machine-readable code using a code creation tool provided by the social-networking platform. In one embodiment, the group member may access the code creation tool via an administrator webpage used to create and/or manage the digital social group (e.g., an administrator group-information page 600 as illustrated in FIG. 6). In some examples, the code creation tool may allow the group member to select a customized image that may be included in the machine-readable code. Using FIG. 2 as a specific example, machine-readable code 200 may be associated with a digital parental support group and include an image of a parent and child that was previously selected by a group member using the code creation tool.

In some examples, the code creation tool may allow a group member to select different content that may be included in the machine-readable code (e.g., a request to access a group page, restriction information, and/or share-source information). In one embodiment, the code creation tool may allow the group member to digitally distribute the machine-readable code to other users and/or members to facilitate sharing of the machine-readable code by the other users and/or members. For example, the code creation tool may generate an image file, which may then be distributed.

The image sensor may digitally scan the machine-readable code in response to a variety of events. In some examples, the image sensor may digitally scan the machine-readable code in response to receiving an instruction from a social-networking application, installed on the user's mobile device, that is managed by the social-networking platform. In one example, the social-networking application may interact with the image sensor using a camera API associated with the image sensor.

In some examples, the image sensor may scan the machine-readable code in response to receiving user input (e.g., received via the social-networking application). In one embodiment, a user may initiate the scanning by (1) opening the social-networking application on the user's mobile device and (2) positioning the image sensor over the machine-readable code. Using FIG. 3 as a specific example, a user may open a social-networking application on a mobile device 300 and position an image sensor of mobile device 300 over machine-readable code 200. In other examples, the image sensor may be configured to automatically detect and scan machine-readable code whenever machine-readable code is positioned within the image sensor's visual field. In these examples, the social-networking application may automatically open and/or may automatically receive input from the image sensor in response to a determination that the image sensor is scanning and/or has scanned a machine-readable code.

The machine-readable code may be positioned in a variety of places and using a variety of mediums. In some examples, the machine-readable code may be located on a physically printed medium, such as a poster or a publication. To give a specific example, the machine-readable code may be associated with a digital parental support group and may be located on a poster (e.g., a poster hung in the hallway of a hospital). In other examples, the machine-readable code may be located on digital materials (e.g., on a webpage, in an email, and/or in a text).

Returning to FIG. 1, at step 120, one or more of the systems described herein may use a physical system processor of the user's mobile device to decode a data item encoded in the machine-readable code. In one example, a social-networking application installed on the user's mobile device (e.g., the social-networking application described above in connection with step 110) may use the system processor to decode the data item.

The data item may include a variety of information. In some embodiments, the encoded data item may include a hash string to be sent to a server managed by the social-networking platform (i.e., the social-networking platform used to organize the digital social group associated with the machine-readable code). The hash string may include a variety of types of information to be sent to the server. In one embodiment, the hash string may include a request to access a digital group page of the digital social group. In this embodiment, the machine-readable code may include the hash string instead of including group identification data for the digital social group, freeing up space for the machine-readable code to include other information.

In some examples, the hash string may include share-source information describing a source of the machine-readable code. For example, the hash string may include information describing a medium on which the machine-readable code was printed and/or published, a user who printed and/or published the machine-readable code, a geographic location of the machine-readable code, a time at which the machine-readable code was printed and/or published, etc.

In one example, the hash string may include one or more restrictions to joining the digital social group. The hash string may include a variety of types of restrictions. In some examples, the restriction may be based on user demographics. For example, the hash string may include a restriction that indicates that only users of a particular age, gender, and/or in a particular location are permitted to join the digital social group. To give a specific example, the digital social group may represent a support group for battered women and the hash string may include a restriction that indicates that only females are permitted to join the group.

In other examples, the hash string may include a time restriction. For example, the hash string may include a restriction that indicates that users may only join the digital social group on a particular day and/or range of days. To give a specific example, the digital social group may represent a discussion group and the hash string may include a restriction that indicates that the discussion group may only be joined during a time period associated with a topic being discussed by the discussion group.

Returning to FIG. 1, at step 130, one or more of the systems described herein may use a physical system processor of the user's mobile device to send, to the server, the hash string encoded in the machine-readable code. In one example, a social-networking application installed on the user's mobile device (e.g., the social-networking application described above in connection with steps 110 and 120) may use the system processor to send the hash string to the server. Using FIG. 4 as a specific example, mobile device 300 may (e.g., via the social-networking application) send the hash string over a network 400 to a server 402.

Returning to FIG. 1, at step 140, one or more of the systems described herein may use a physical system processor of the user's mobile device to present, via a display element of the user's mobile device, a digital group page of the digital social group sent by the server in response to the server receiving the hash string. Using FIG. 5 as a specific example, the system processor may present a digital group page 500 on mobile device 300. In one embodiment, the server may send the digital group page to the user's mobile device to be displayed via a window of a social-networking application installed on the user's mobile device (e.g., the social-networking application described above in connection with steps 110, 120, and 130).

In some examples, the server may (e.g., prior to sending the digital group page to the user's mobile device) automatically join an online account of the user to the digital social group. To give a specific example, a FACEBOOK server may automatically join the user's FACEBOOK account to a digital social group organized via FACEBOOK. In one embodiment, the server may identify the user's online account based on information sent by the system processor (e.g., via the social-networking application) that identifies the user's online account. In other examples, the server may (e.g., prior to sending the digital group page to the user's mobile device) automatically send a digital request for administrator permission to join the digital social group.

In one embodiment, the server may determine that the user's mobile device has not been associated with an online account of the social-networking platform. In one example, the server may determine that the user's mobile device has not been associated with an online account in response to detecting that the user's mobile device has accessed the server via a browser that has not been logged into an online account, instead of accessing the server via a social-networking application and/or a browser that has been logged into an online account. In these examples, the user's mobile device may, based on information received from the server and prior to presenting the digital group page, present a prompt from the social-networking platform to create an online account with the social-networking platform.

In some examples, the server may determine that the user is eligible to join the digital social group prior to connecting the user's mobile device to the digital social group. For example, the server may determine that the user is eligible to join the digital social group based on a determination that a restriction has been satisfied (e.g., a restriction described in the hash string sent to the server). In one example, the server may determine that the user satisfies a user demographic restriction (e.g., based on information extracted from the user's online account with the social-networking platform). In another example, the server may determine that a time at which the user's mobile device transmitted the hash string satisfies a time restriction. In these examples, the server may connect the user to the digital social group (e.g., by sending the digital group page to the user's mobile device and/or by automatically joining an online account of the user to the digital social group) based on determining that the restriction has been satisfied.

In examples in which the hash string sent to the server includes share-source information, the server may create a report of share-sources based at least in part on the share-source information received in the hash string from the user's mobile device. In some such examples, this report may be provided to an administrator and/or an organizer of the digital social group. In one embodiment, such a report may be provided via an administrator group-information page hosted by the social-networking platform, which may be accessed by the administrator and/or the organizer. Using FIG. 6 as a specific example, an administrator group-information page 600 may include a "share-sources" link to content describing various sources on which the machine-readable code was printed and/or data relating to how many times and/or how often machine-readable code was scanned from the various sources.

As described throughout the instant disclosure, the disclosed systems and methods may provide a direct and convenient entry for users to join an online social group from an offline environment. In some instances, this method of joining may be quite meaningful, allowing users to (1) discover, from a physical world location, a social group that they may only have access to digitally and (2) digitally access and join the social group, using the physical world location as an entry point. In some examples, the disclosed systems and methods may allow group members to generate machine-readable code that may be shared via physical mediums (e.g., posters, publications, etc.) and/or shared digitally in a webpage and/or a digital message such as a text and/or email. In one embodiment, a social-networking application, managed by a social-networking platform hosting the online social group and installed on the user's mobile device, may be used to scan the machine-readable code in order to join the online social group. In some examples, the machine-readable code may have the ability to track share-source information, which may be used to help administrators acquire insights.

In some examples, the above-described method may be encoded as computer-readable instructions on a computer-readable medium. In one example, the instant disclosure may include a system with several modules stored in memory of the user's mobile device, including (1) a scanning module configured to use the image sensor on the user's mobile device to digitally scan the machine-readable code associated with the digital social group organized via the social-networking platform, (2) a decoding module configured to decode the data item, encoded in the machine-readable code, that includes the hash string to be sent to the server managed by the social-networking platform, (3) a sending module configured to send, to the server, the hash string encoded in the machine-readable code, and (4) a presenting module configured to present, via the display element of the user's mobile device, the group page of the digital social group sent by the server in response to the server receiving the hash string. The system may also include at least one physical processor configured to execute the scanning module, the decoding module, the sending module, and the presenting module.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive encoded data from a machine-readable code, transform the encoded data into a decoded hash string to be sent to a server, and send the hash string to the server in order to connect with a digital social group. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    opening a social-networking application, installed on a user's mobile device, that enables the user to scan machine-readable code using an image sensor of the mobile device, wherein the social-networking application is limited to only navigating to content hosted by a social-networking platform that manages the social-networking application;
    receiving, from the social-networking application, an instruction to scan a machine-readable code associated with a digital social group organized via the social-networking platform; and
    in response to receiving the instruction from the social-networking application:
        using the image sensor to digitally scan the machine-readable code; and
        using a system processor of the user's mobile device to:
            decode at least one data item encoded in the machine-readable code, wherein the data item comprises a hash string to be sent to a server managed by the social-networking platform;
            send, to the server, the hash string encoded in the machine-readable code; and
            present, via a display element of the user's mobile device, a group page of the digital social group sent by the server in response to the server receiving the hash string.

2. The computer-implemented method of claim 1, wherein, prior to sending the group page to the user's mobile device, the server automatically joins an online account of the user to the digital social group.

3. The computer-implemented method of claim 1, wherein the method further comprises, prior to presenting the group page via the display element, presenting, via the display element of the user's mobile device, a prompt from the social-networking platform to create an online account with the social-networking platform.

4. The computer-implemented method of claim 1, wherein receiving the instruction to scan the machine-readable code comprises receiving the instruction in response to at least one of:
    receiving, via an interface of the social-networking application, user input to scan the machine-readable code; or
    determining that the image sensor has been positioned over the machine-readable code.

5. The computer-implemented method of claim 1, wherein the machine-readable code comprises machine-readable code located on a physically printed medium.

6. The computer-implemented method of claim 5, wherein the physically printed medium comprises a poster.

7. The computer-implemented method of claim 1, wherein:
    an organizer of the digital social group created the machine-readable code using a code creation tool provided by the social-networking platform; and
    the code creation tool is accessed via an administrator webpage used to create and/or manage the digital social group.

8. The computer-implemented method of claim 7, wherein the machine-readable code comprises a customized image selected by the organizer.

9. The computer-implemented method of claim 1, wherein the machine-readable code comprises a two-dimensional matrix code.

10. The computer-implemented method of claim 9, wherein the machine-readable code comprises a Quick Response (QR) code.

11. The computer-implemented method of claim 1, wherein the hash string comprises a request to access the group page of the digital social group.

12. The computer-implemented method of claim 11, wherein the hash string further comprises source information describing a source from which the machine-readable code was scanned.

13. The computer-implemented method of claim 12, wherein the server creates a report of sources from which the machine-readable code has been scanned based at least in part on the source information received in the hash string from the user's mobile device.

14. The computer-implemented method of claim 11, wherein the hash string further comprises at least one restriction to joining the digital social group.

15. The computer-implemented method of claim 14, wherein:
the restriction comprises a user demographic restriction; and
the server determines that an online account of the user is eligible to join the digital social group based on a determination that a user demographic of the user satisfies the restriction.

16. The computer-implemented method of claim 15, wherein the user demographic comprises at least one of:
an age of the user;
a gender of the user; or
a geographic location of the user.

17. The computer-implemented method of claim 14, wherein:
the restriction comprises a time restriction; and
the server determines that an online account of the user is eligible to join the digital social group based on a determination that a time at which the user's mobile device sent the hash string satisfies the time restriction.

18. A system comprising:
a presenting module, stored in memory of a user's mobile device, configured to open a social-networking application, installed on the user's mobile device, that enables the user to scan machine-readable code using an image sensor of the user's mobile device, wherein the social-networking application is limited to only navigating to content hosted by a social-networking platform that manages the social-networking application;
a scanning module, stored in memory of the user's mobile device, configured to:
receive, from the social-networking application, an instruction to scan a machine-readable code associated with a digital social group organized via the social-networking platform; and
in response to receiving the instruction from the social-networking application, use the image sensor to digitally scan the machine-readable code;
a decoding module, stored in the memory of the user's mobile device, configured to decode at least one data item encoded in the machine-readable code, wherein the data item comprises a hash string to be sent to a server managed by the social-networking platform;
a sending module, stored in the memory of the user's mobile device, configured to send, to the server, the hash string encoded in the machine-readable code;
wherein the presenting module is further configured to present, via a display element of the user's mobile device, a group page of the digital social group sent by the server in response to the server receiving the hash string; and
at least one physical processor configured to execute the scanning module, the decoding module, the sending module, and the presenting module.

19. The system of claim 18, wherein the machine-readable code comprises a Quick Response (QR) code.

20. A non-transitory computer-readable medium comprising:
one or more computer-readable instructions that, when executed by at least one processor of a user's mobile device, cause the user's mobile device to:
open a social-networking application, installed on a user's mobile device, that enables the user to scan machine-readable code using an image sensor of the mobile device, wherein the social-networking application is limited to only navigating to content hosted by a social-networking platform that manages the social-networking application;
receive, from the social-networking application, an instruction to scan a machine-readable code associated with a digital social group organized via the social-networking platform; and
in response to receiving the instruction from the social-networking application:
use the image sensor to digitally scan the machine-readable code;
decode at least one data item encoded in the machine-readable code, wherein the data item comprises a hash string to be sent to a server managed by the social-networking platform;
send, to the server, the hash string encoded in the machine-readable code; and
present, via a display element of the user's mobile device, a group page of the digital social group sent by the server in response to the server receiving the hash string.

* * * * *